(12) United States Patent
Gross et al.

(10) Patent No.: US 6,981,470 B2
(45) Date of Patent: Jan. 3, 2006

(54) METHODS AND APPARATUS FOR SUPPORTING EGGS DURING IN OVO INJECTION

(75) Inventors: Edward W. Gross, Raleigh, NC (US); Phillip N. Strayer, Apex, NC (US)

(73) Assignee: Embrex, Inc., Durham, NC (US)

( * ) Notice: Subject to any disclaimer, the term of this patent is extended or adjusted under 35 U.S.C. 154(b) by 61 days.

(21) Appl. No.: 10/686,762

(22) Filed: Oct. 16, 2003

(65) Prior Publication Data

US 2004/0144324 A1 Jul. 29, 2004

Related U.S. Application Data

(60) Provisional application No. 60/442,863, filed on Jan. 27, 2003.

(51) Int. Cl.
A01K 41/00 (2006.01)
A01K 43/00 (2006.01)
A01K 45/00 (2006.01)

(52) U.S. Cl. .................... 119/322; 119/323; 119/6.8

(58) Field of Classification Search ............. 119/6.8, 119/322, 323; 99/440; D07/503, 611; 356/54–56; 209/510, 512; 294/87.12; D10/48; 493/913; 220/508
See application file for complete search history.

(56) References Cited

U.S. PATENT DOCUMENTS

| | | | |
|---|---|---|---|
| 2,762,365 A | 9/1956 | Wagner et al. .............. 128/1 |
| 3,270,661 A * | 9/1966 | Juvan ....................... 99/343 |
| 3,377,989 A | 4/1968 | Sandhage et al. ........... 119/1 |
| 3,420,743 A | 1/1969 | Sandhage et al. ........ 195/104 |
| 3,506,140 A | 4/1970 | Koch et al. ................. 214/1 |
| 3,594,285 A | 7/1971 | Noren ..................... 195/127 |
| 3,616,262 A | 10/1971 | Coady et al. ............ 195/127 |
| 4,040,388 A | 8/1977 | Miller ....................... 119/1 |
| 4,458,630 A | 7/1984 | Sharma et al. ............. 119/1 |
| 4,469,047 A | 9/1984 | Miller ....................... 119/1 |
| 4,593,646 A | 6/1986 | Miller et al. ............... 119/1 |
| 4,903,635 A | 2/1990 | Hebrank .................... 119/1 |
| 4,928,628 A | 5/1990 | Gassman et al. ............ 119/1 |
| 5,028,421 A | 7/1991 | Fredericksen et al. .... 424/85.2 |
| 5,056,464 A | 10/1991 | Lewis ..................... 119/6.8 |
| 5,136,979 A | 8/1992 | Paul et al. ............... 119/6.8 |
| 5,158,038 A | 10/1992 | Sheeks et al. ........... 119/6.8 |
| 5,160,019 A * | 11/1992 | Temming .............. 198/803.9 |
| 5,176,101 A | 1/1993 | Paul et al. ............... 119/6.8 |
| RE35,973 E | 12/1998 | Paul et al. ............... 119/6.8 |
| 6,032,612 A | 3/2000 | Williams .................. 119/6.8 |
| 6,145,668 A | 11/2000 | DePauw et al. .......... 209/510 |
| 6,244,214 B1 | 6/2001 | Hebrank .................. 119/6.8 |
| 6,286,455 B1 | 9/2001 | Williams .................. 119/6.8 |

* cited by examiner

Primary Examiner—Teri Pham Luu
Assistant Examiner—Bret Hayes
(74) Attorney, Agent, or Firm—Myers Bigel Sibley & Sajovec

(57) ABSTRACT

In ovo injection apparatus include an egg carrier configured to hold a plurality of eggs and to provide external access to the eggs, a plurality of injection devices positioned above the carrier, and an egg support assembly positioned beneath the carrier that is configured to support each egg in the carrier during contact therewith by a respective injection device. The egg support assembly includes a frame, a plate having an array of openings attached to the frame, and a plurality of pedestals removably secured within a respective one of the openings. The egg support assembly is operatively associated with the plurality of injection devices such that each pedestal moves upwardly through a respective opening in the carrier to support an egg as a respective injection device makes contact with the egg.

27 Claims, 17 Drawing Sheets

METHODS AND APPARATUS FOR SUPPORTING EGGS DURING IN OVO INJECTION

RELATED APPLICATION

This application claims the benefit of U.S. Provisional Application No. 60/442,863 filed Jan. 27, 2003, the disclosure of which is incorporated herein by reference in its entirety as if set forth fully herein.

FIELD OF THE INVENTION

The present invention relates generally to eggs and, more particularly, to methods and apparatus for processing eggs in ovo.

BACKGROUND OF THE INVENTION

Injections of various substances into avian eggs have been employed to decrease post-hatch mortality rates, increase the potential growth rates or eventual size of the resulting bird, and even to influence the gender determination of the embryo. Similarly, injections of antigens into live eggs have been employed to incubate various substances used in vaccines which have human or animal medicinal or diagnostic applications. Examples of substances that have been used for, or proposed for, in ovo injection include vaccines, antibiotics and vitamins. In addition, removal of material from avian eggs has been employed for various purposes, such as testing and vaccine harvesting. Examples of in ovo treatment substances and methods of in ovo injection are described in U.S. Pat. No. 4,458,630 to Sharma et al., U.S. Pat. No. 5,028,421 to Fredericksen et al., and U.S. Pat. Nos. 6,032,612 and 6,286,455 to Williams, the contents of which are incorporated by reference herein in their entireties.

An egg injection apparatus conventionally is designed to operate in conjunction with commercial egg carrier devices or flats. The injection apparatus may comprise a plurality of injection needles which operate simultaneously or sequentially to inject a plurality of eggs, or a single injection needle used to inject a plurality of eggs. The injection apparatus may comprise an "injection head" which comprises the injection needle or needles, and wherein each injection needle is in fluid communication with a source containing a treatment substance to be injected. A single fluid source may supply all of the injection needles in an injection device, or multiple fluid sources may be utilized.

An exemplary in ovo injection apparatus 10 is illustrated in FIG. 1. The illustrated apparatus 10 includes an egg carrier (e.g., an egg flat) 15 that supports eggs 20 for transport, a frame 16, and a plurality of injection delivery devices, or heads, 25 with fluid delivery means such as needles positioned therein in accordance with known techniques. The illustrated flat 15 holds a plurality of eggs 20 in a substantially upright position and is configured to provide external access to predetermined areas of the eggs 20. Specifically, each egg 20 can be contacted from above the flat 15 and from beneath the flat 15. Each egg 20 is held by the illustrated flat 15 so that a respective end thereof is in proper alignment relative to a corresponding one of the injection heads 25.

In ovo injection of substances (as well as in ovo extraction of materials) typically occurs by piercing an egg shell to form an opening (e.g., via a punch), extending an injection needle through the hole and into the interior of the egg (and in some cases into the avian embryo contained therein), and injecting treatment substance(s) through the needle and/or removing material therefrom. For example, each injection head 25 of the apparatus of FIG. 1 includes a punch 26 and an injection needle 27 with the punch surrounding the needle 27 in coaxial relationship therewith as illustrated in FIGS. 2A–2B. The punch 26 is configured to pierce the shell of an egg 20 so as to form an opening therein and the needle 27 is configured to deliver a substance into the egg 20 (FIG. 2B) via the opening.

Egg flats utilized in conjunction with in ovo injection apparatus typically contain an array of pockets that are configured to support a respective plurality of eggs in a generally upright orientation. An exemplary egg flat 15 is illustrated in FIGS. 3A–3B. The illustrated egg flat 15 includes a plurality of rows of pockets 32. Each pocket 32 is configured to receive one end 20a of a respective egg 20 so as to support the respective egg 20 in a substantially vertical position. Each pocket 32 of the illustrated egg flat 15 contains a plurality of tabs 34 that are configured to support a respective egg as illustrated in FIG. 4.

Although effective in supporting eggs during transport, these support tabs 34 can damage eggs during in ovo processing. The force applied to an egg by an in ovo processing punch or needle can push an egg downwardly against the support tabs 34 with sufficient force to cause the egg to crack. In addition to reducing hatch rates, cracked eggs can lead to contamination of other eggs within an egg flat, as well as contamination of processing equipment.

In addition, support tabs in conventional egg flats are typically somewhat flexible and may deflect when an egg supported thereby is punched. In addition, conventional egg flats themselves may be somewhat flexible. As such, during punching of a plurality of eggs, an egg flat structure may warp and/or twist. This warping and/or twisting of an egg flat may add to the deflection of the support tabs such that when the force of punching is removed the egg flat and tabs can grip an egg, thereby making removal of the egg from the egg flat difficult. Accordingly, it would be desirable to be able to punch through the shell of an egg supported within an egg flat without causing the egg to crack and without causing the egg to become stuck within the egg flat.

SUMMARY OF THE INVENTION

In view of the above discussion, an in ovo injection apparatus, according to embodiments of the present invention, includes an egg carrier configured to hold a plurality of eggs and to provide external access to the eggs, a plurality of injection devices positioned above the carrier, and an egg support assembly positioned beneath the carrier that is configured to support each egg in the carrier during contact therewith by a respective injection device. According to embodiments of the present invention, the egg support assembly includes a frame that is movable between an operative position and a retracted position, a plate having an array of openings attached to the frame, and a plurality of pedestals. Each pedestal is removably secured within a respective one of the openings and includes a free end portion configured to engage an egg within the carrier when the frame is in the operative position. The egg support assembly is operatively associated with the plurality of injection devices such that each pedestal moves upwardly through a respective opening in the carrier to support an egg as a respective injection device makes contact with the egg.

According to embodiments of the present invention, the egg support assembly is configured to lift each egg slightly from the carrier during contact with each egg by a respective injection device. Moreover, the height of the free end portion of each pedestal relative to the plate may be adjustable.

According to embodiments of the present invention, a method of injecting eggs in ovo includes positioning an egg carrier containing a plurality of eggs beneath a plurality of injection devices, and supporting the plurality of eggs from beneath the egg carrier while simultaneously delivering a predetermined dosage of a treatment substance into each egg and/or removing material from each egg. The eggs may be lifted slightly from the carrier according to embodiments of the present invention.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE INVENTION

Figure 1:
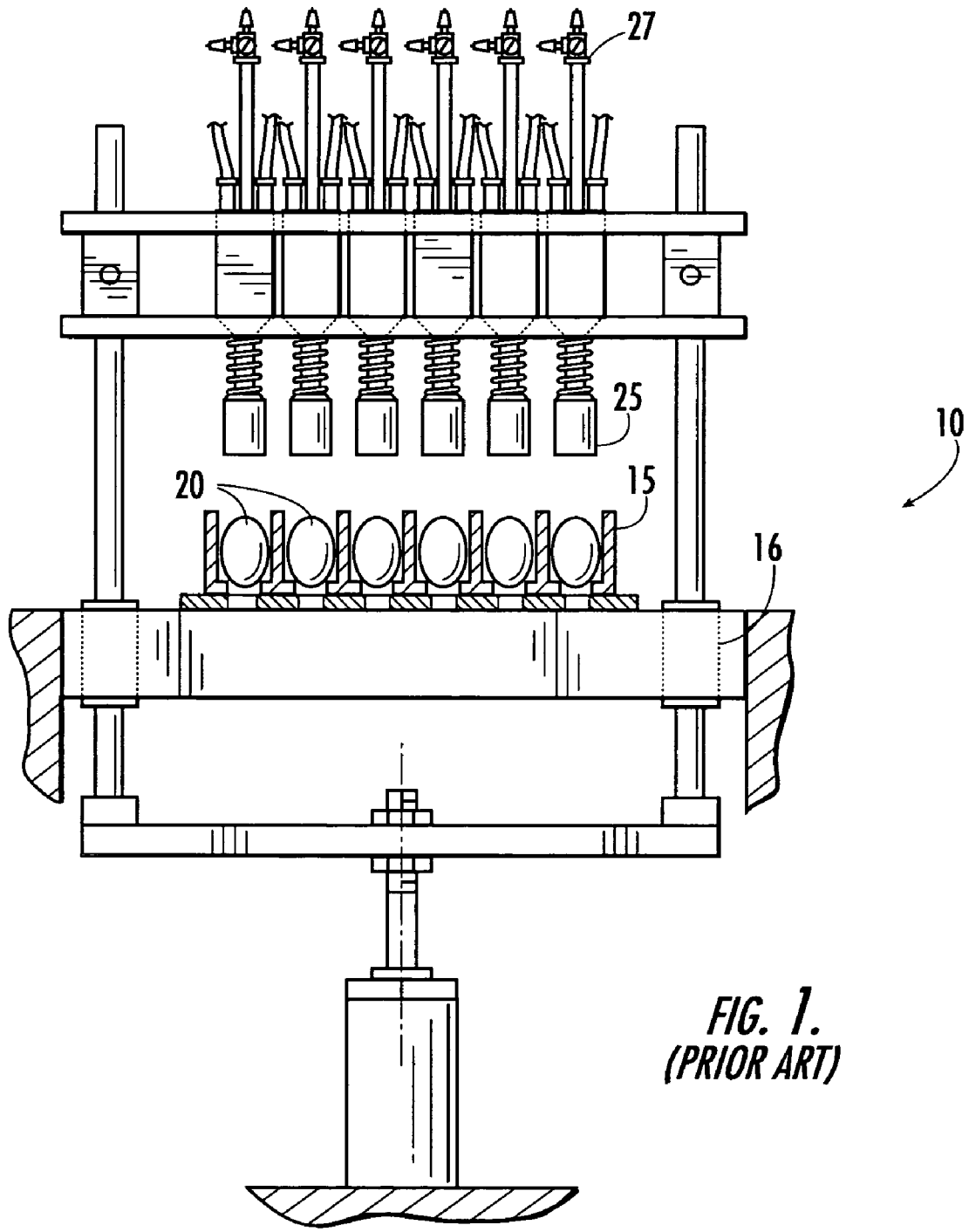
FIG. 1 is a side elevation view of an exemplary in ovo processing apparatus that is configured to form an opening in an egg shell and inject material into an egg and/or remove material from an egg.
Figure 2A:
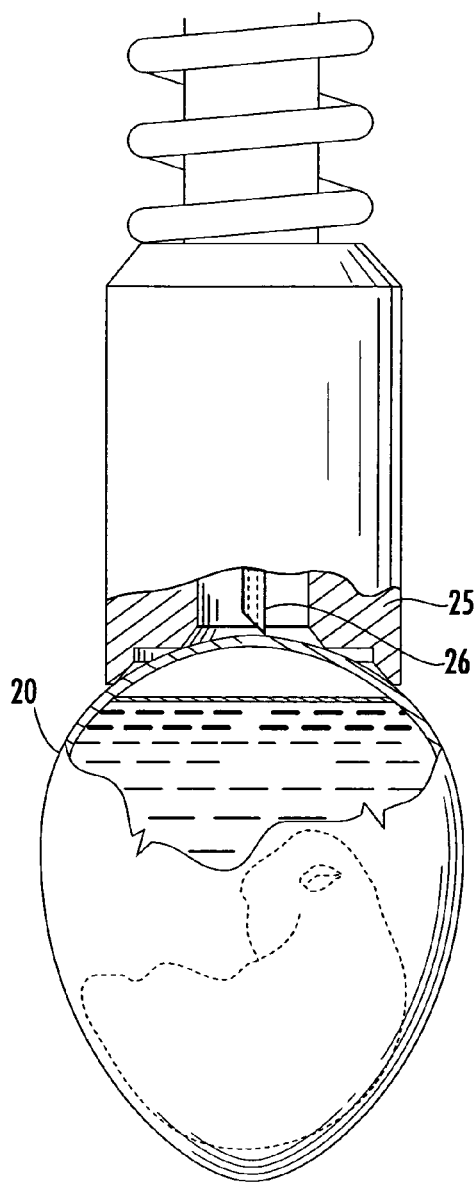
FIGS. 2A–2B are cross-sectional views of a lower portion of an injector head of the apparatus of FIG. 1 wherein a punch is about to pierce the shell of an egg (FIG. 2A), and wherein a needle is injecting material into an egg after an opening has been formed in the shell thereof by the punch (FIG. 2B).
Figure 2B:
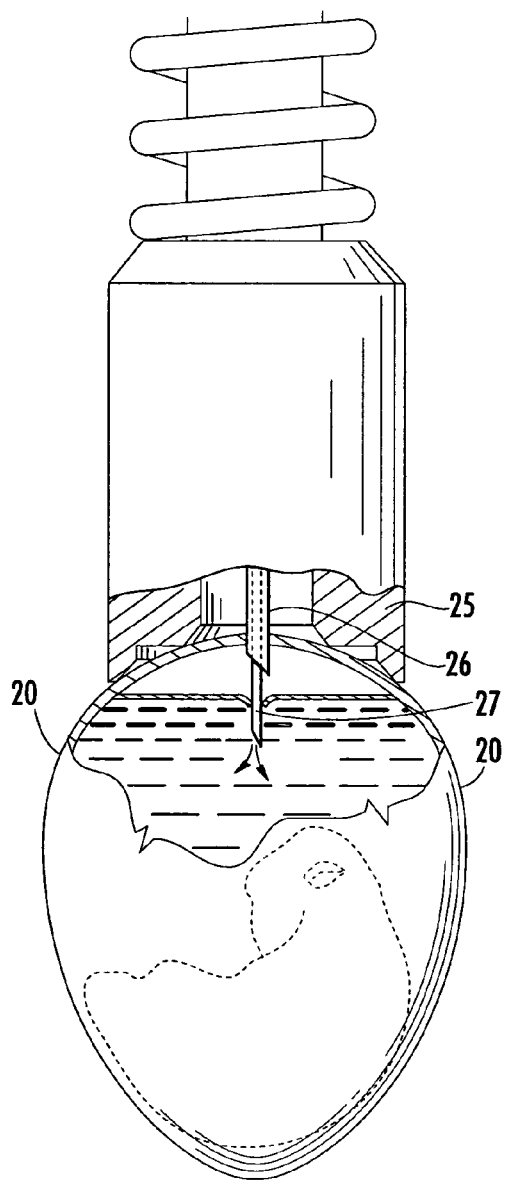
Figure 3A:
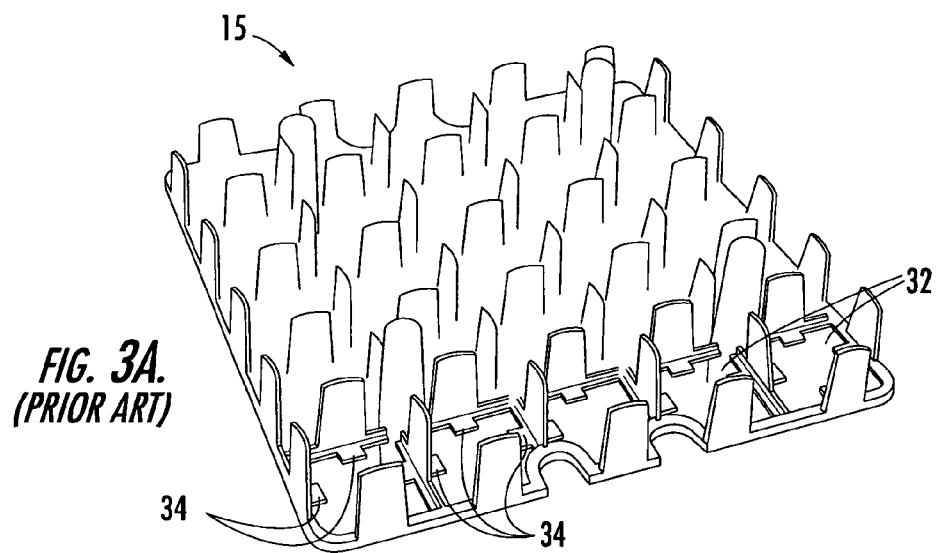
FIG. 3A is a perspective view of a conventional egg flat.
Figure 3B:
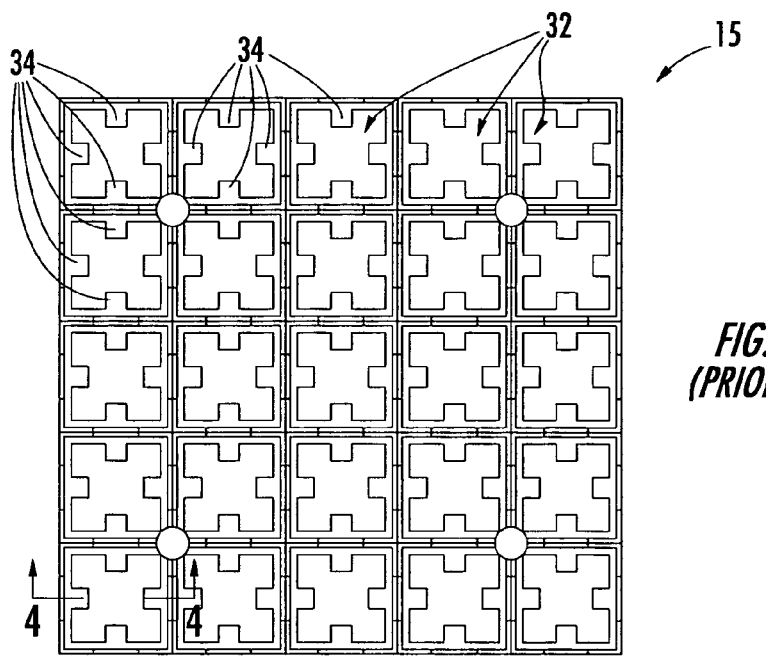
FIG. 3B is a top plan view of the egg flat of FIG. 3A.
Figure 4:
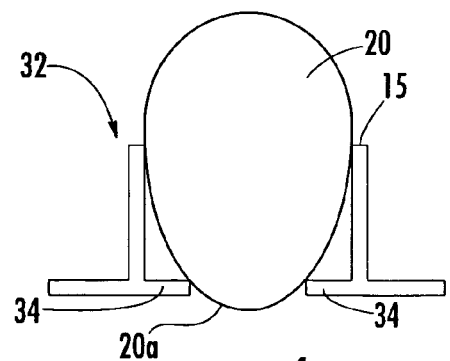
FIG. 4 is a cross-sectional view of the egg flat of FIG. 3B taken along lines 4—4 and illustrating an egg supported within a pocket thereof.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used in the description of the invention and the appended claims, the singular forms "a", "an" and "the" are intended to include the plural forms as well, unless the context clearly indicates otherwise.

All publications, patent applications, patents, and other references mentioned herein are incorporated by reference in their entirety.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. Terms such as "upwardly", "downwardly", "vertical", "horizontal" and the like are used herein for the purpose of explanation only.

Methods and apparatus according to embodiments of the present invention may be practiced with any type of avian egg, including, but not limited to, chicken eggs, turkey eggs, duck eggs, geese eggs, quail eggs, ostrich eggs, emu eggs, squab eggs, game hen eggs, pheasant eggs, exotic bird eggs, etc. Moreover, methods and apparatus according to embodiments of the present invention may be utilized to punch the shell of an egg at any time during the embryonic development period (also referred to as the incubation period) thereof. Embodiments of the present invention are not limited to a particular day during the embryonic development period.

An exemplary egg injection device, with which methods and apparatus for punching eggs according to embodiments of the present invention may be utilized, is the INO-VOJECT® brand automated injection device (Embrex, Inc., Research Triangle Park, N.C.). However, embodiments of the present invention may be utilized with any type of in ovo processing device, without limitation.

Methods and apparatus according to embodiments of the present invention may be utilized to inject eggs in various orientations. Embodiments of the present invention are not limited only to in ovo injection devices that inject eggs in the illustrated orientation.

Figure 5:
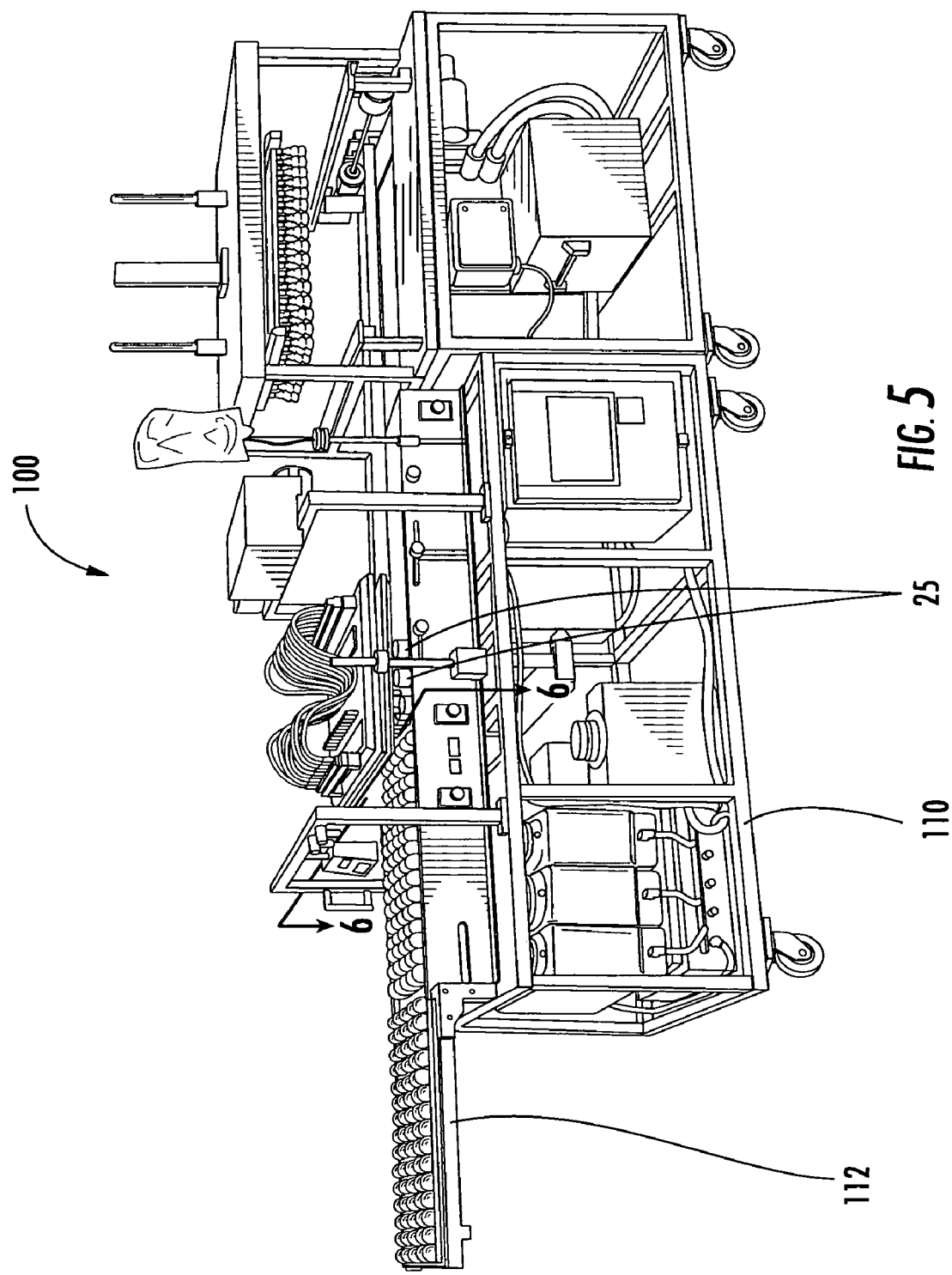
FIG. 5 is a perspective view of an in ovo injection apparatus that includes an egg support assembly according to embodiments of the present invention.

Referring now to FIG. 5, an in ovo injection apparatus 100 incorporating an egg support assembly, according to embodiments of the present invention, is illustrated. The illustrated in ovo injection apparatus 100 includes a frame 110 that supports a conveyor system 112 and a plurality of egg injection devices 25.

Figure 6:
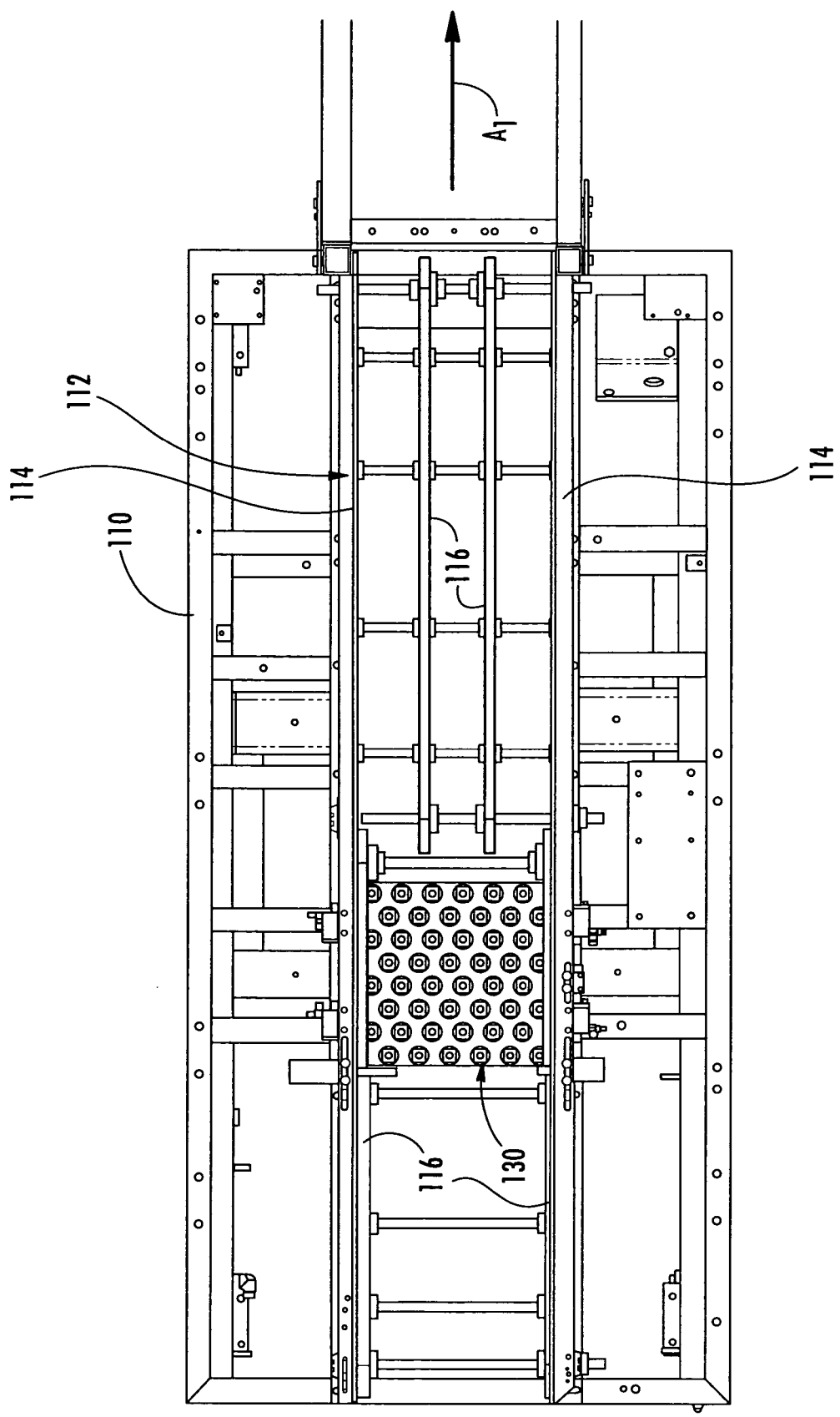
FIG. 6 is a plan view of the injection apparatus of FIG. 5 taken along lines 6—6 and illustrating the conveyor system.

FIG. 6 is a plan view of the injection apparatus 100 of FIG. 5, taken along lines 6—6, and illustrating the conveyor system 112. The illustrated conveyor system 112 includes a pair of substantially parallel rails 114 and a plurality of guides 116 therebetween. The guides 116 are configured to slidably receive egg flats placed thereon for movement along the direction indicated by arrow $A_1$. In operation, each egg flat is moved along direction $A_1$ to a position directly beneath the egg injection devices so that the plurality of eggs within the flat can be injected.

Figure 7:
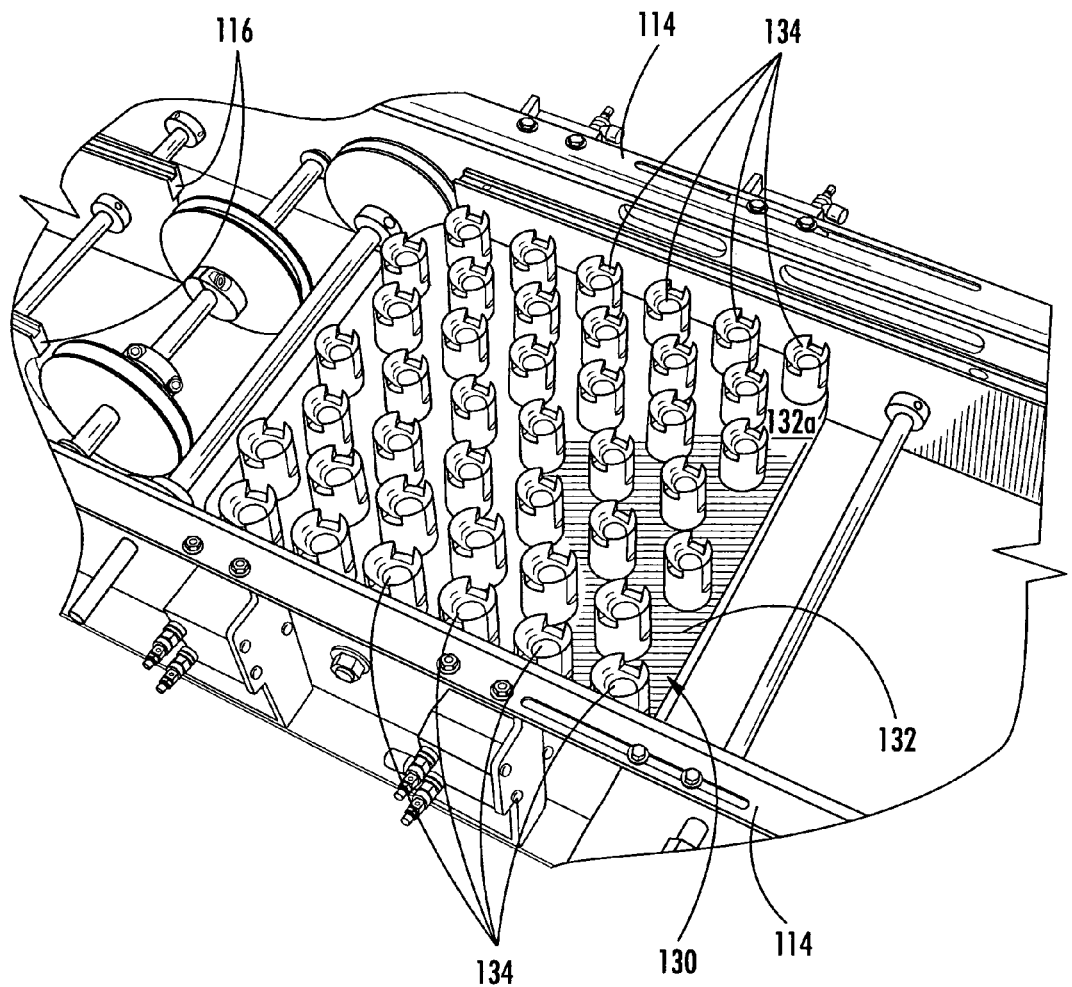
FIG. 7 is a perspective view of the egg support assembly illustrating its location beneath the rails of the conveyor system.

Positioned between illustrated rails 114 is an egg support assembly 130 according to embodiments of the present invention. The egg support assembly 130 is positioned between the rails such that egg flats pass thereover. FIG. 7 is a perspective view of the egg support assembly 130 illustrating its location beneath rails 114, 116. As will be described below, the egg support assembly 130 is configured to support each egg in an egg flat during contact by an egg injection device 25.

The illustrated egg support assembly 130 includes a plate 132 having a plurality of pedestals 134 extending from an upper surface 132a of the plate 132. Each pedestal 134 is configured to support a respective egg in an egg flat positioned thereover, as will be described below. The plate 130 and each pedestal 134 may be formed from any type of material that is easily cleanable, and that, for example, is easy to machine. An exemplary material includes Hydrex 4101, available from the Hyde Corporation. However, embodiments of the present invention are not limited to this material. Various materials and combinations of materials may be utilized including, metals, polymers, etc.

Figure 8:
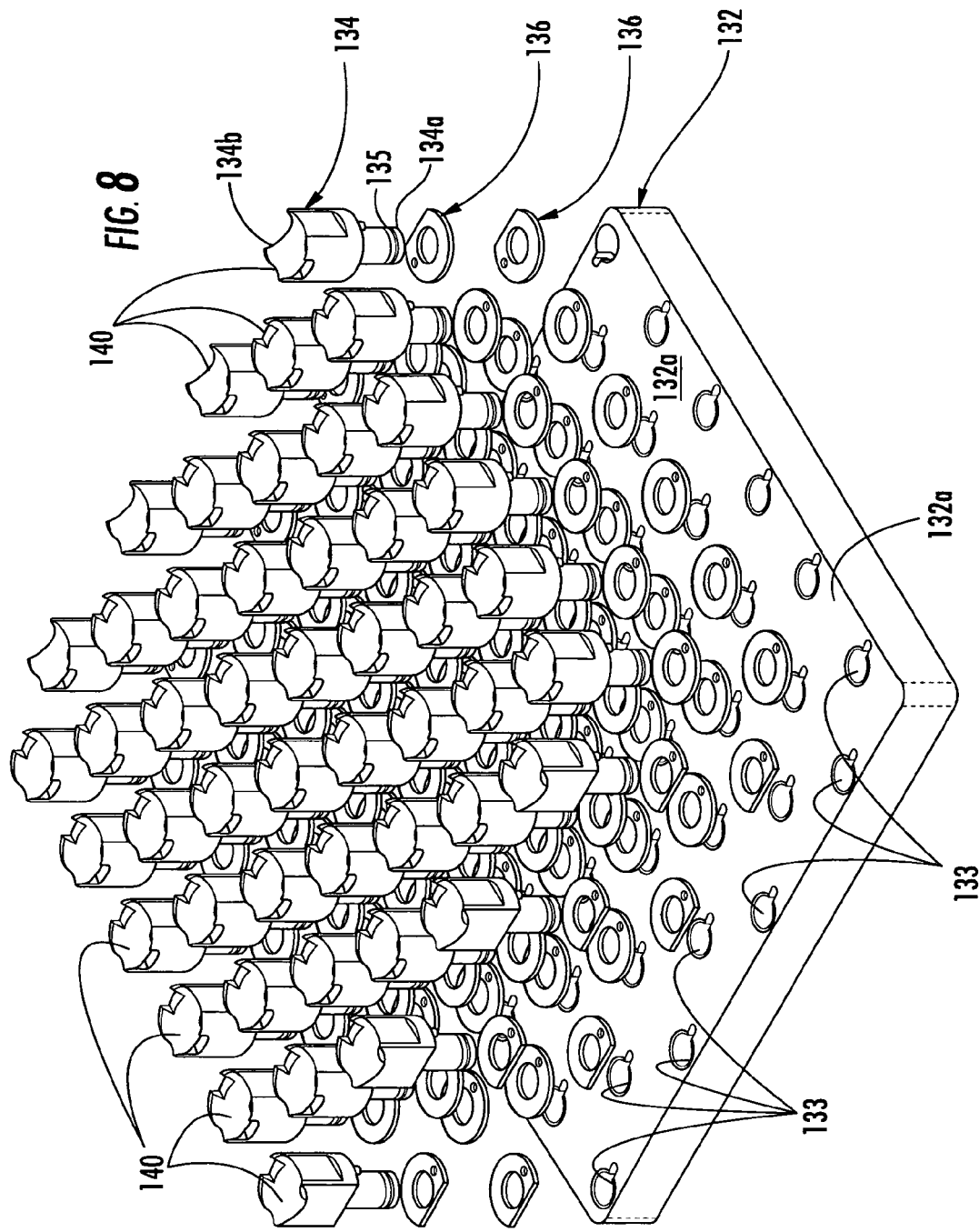
FIG. 8 is an exploded perspective view of the plate and pedestals of the egg support assembly of FIG. 7.

FIG. 8 is an exploded perspective view of the egg support assembly 130 of FIG. 7 that illustrates the plate 132 and pedestals 134. In the illustrated embodiment, the plate 132 includes an array of openings 133 formed therein in a pattern matching the array of pockets in an egg flat. Each pedestal 134 is removably secured within a respective one of the plate openings 133.

Each pedestal 134 includes a proximal end 134a and a distal free end 134b. An O-ring 135 is secured to each pedestal adjacent the proximal end 134a and provides a snug, friction fit when the proximal end 134a is disposed within a respective opening 133. One or more shims 136 may be utilized to adjust the height of the distal end 134b of each pedestal 134 above the plate surface 132a, as illustrated. It may be necessary to adjust pedestal height for specific types of eggs and/or for specific types of egg flats. The pedestals 134 are configured to be easily removed from the plate 132 such that shims can be added and removed as necessary.

Figure 9:
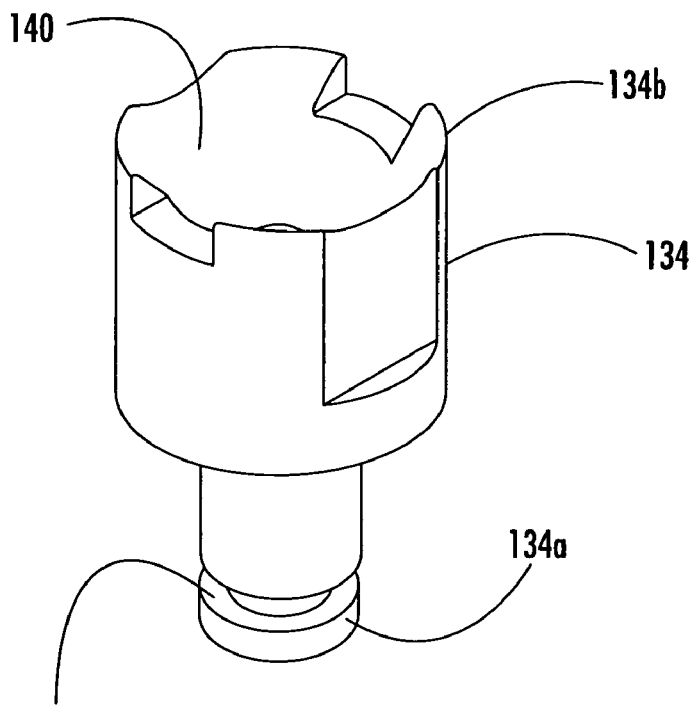
FIG. 9 is a perspective view of a pedestal according to embodiments of the present invention.
Figure 10:
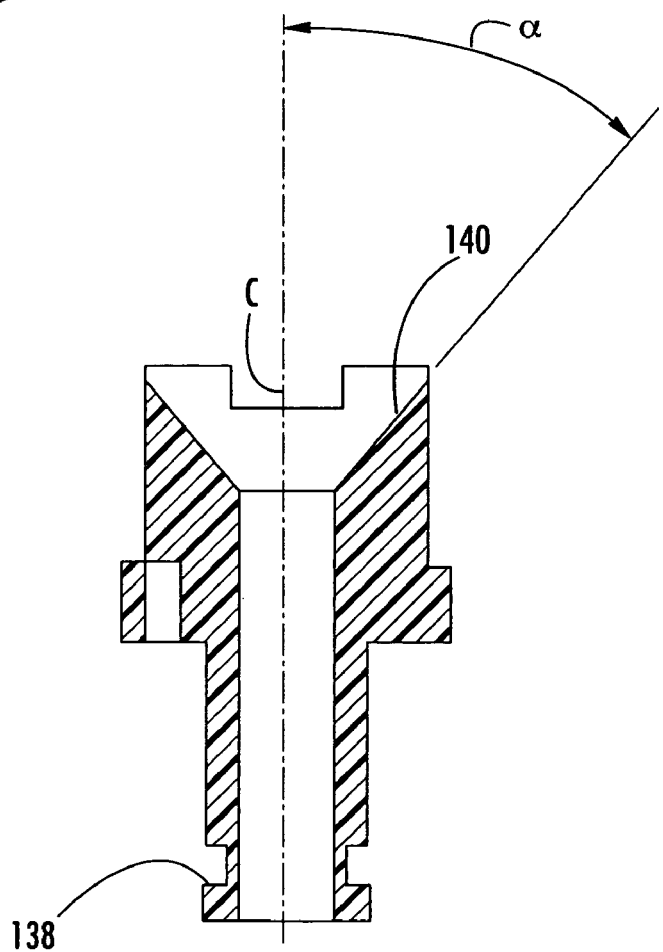
FIG. 10 is a side, cross-sectional view of a pedestal according to embodiments of the present invention.

Referring to FIGS. 9–10, the distal end portion 134b of each pedestal 134 has a concave configuration defined by wall 140 that is configured to engage an egg. Wall 140 is inclined relative to a centerline C of pedestal 134 between about twenty five degrees and about fifty five degrees (25°–55°), although other inclination angles may be utilized. The illustrated wall 140 has a generally flat, conical configuration. However, according to embodiments of the present invention, wall 140 can have a curved conical (e.g. parabolic, etc.) configuration as well. A groove 138 is formed within the illustrated pedestal 134 adjacent the proximal end 134a thereof, and is configured to receive an O-ring 135 therein.

Figure 11:
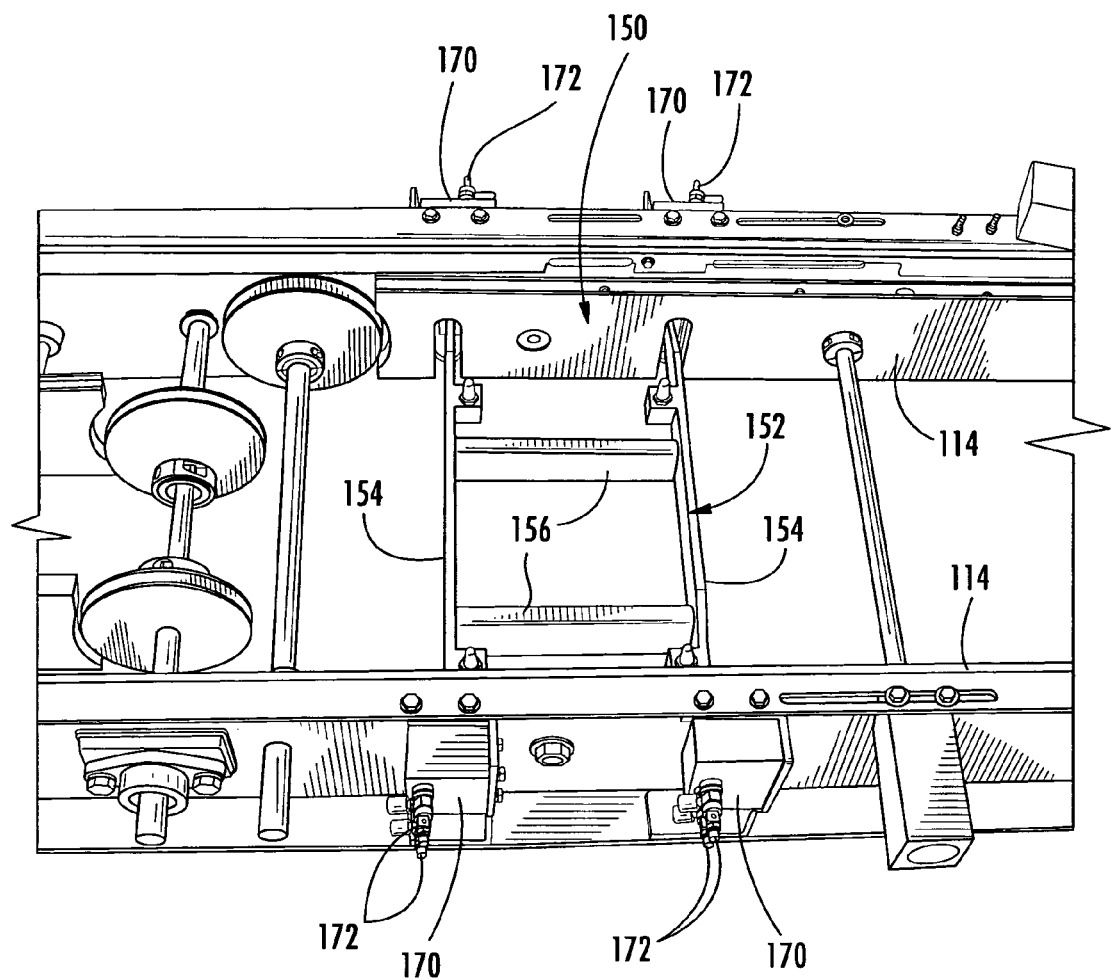
FIG. 11 illustrates a lifting device according to embodiments of the present invention that is configured to raise and lower the egg support assembly of FIG. 7.
Figure 12:
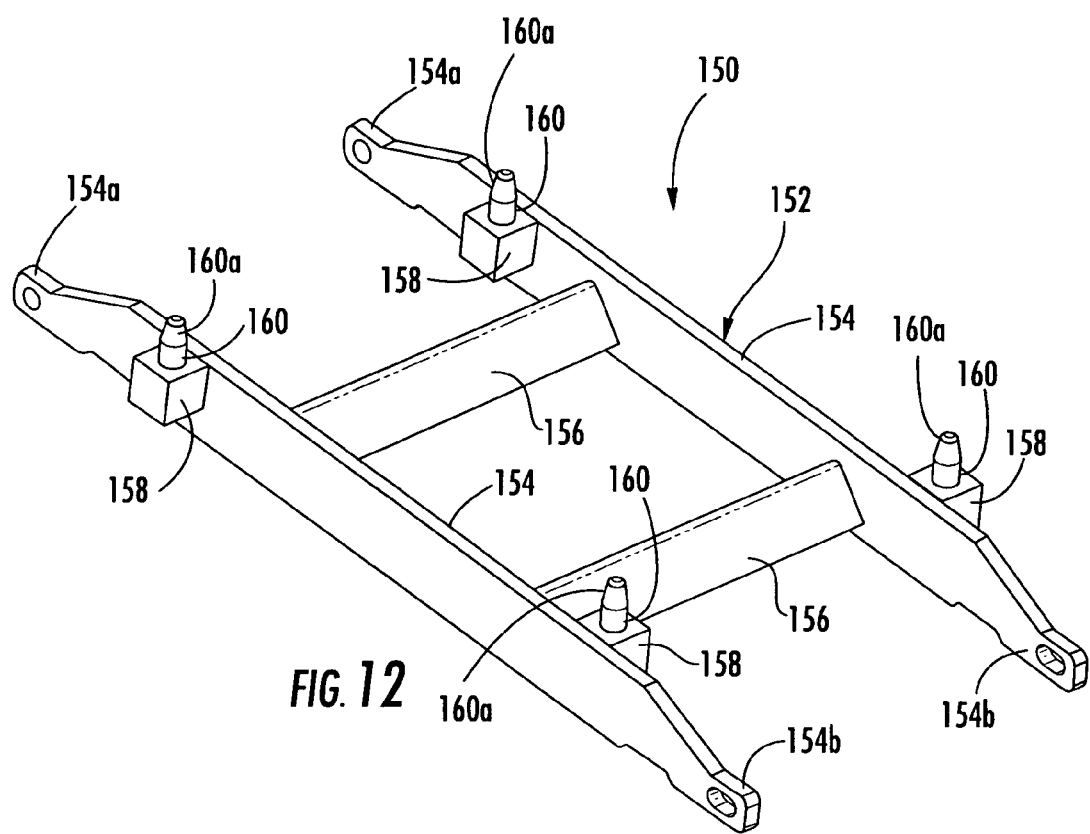
FIG. 12 is a perspective view of the frame portion of the lifting device of FIG. 11.

Referring now to FIGS. 11–12, the plate 132 (FIG. 7) is movably secured between rails 114 via lifting device 150. Lifting device 150 includes a frame 152 having two members 154 extending between opposite rails 114 in generally parallel, spaced-apart relationship, and a pair of spaced-apart support members 156 extending between members 154. Each frame member 154 includes opposite end portions 154a, 154b. Each frame member 154 also includes a pair of support blocks 158 extending from opposite sides thereof, as illustrated. A dowel 160 extends upwardly from each support block 158. The dowels 160 are configured to removably engage respective receptacles in the plate 132 and to thereby support the plate 132. The illustrated dowels 160 have a free end 160a with a tapered configuration. However, embodiments of the present invention are not limited to the illustrated configuration of the dowels 160 or to the illustrated frame 152. The tapered configuration of each dowel 160 facilitates easy removal of plate 132 for cleaning and maintenance.

The frame 152 is movable between an engaged position and a disengaged position via actuators 170. The illustrated actuators are pneumatically controlled and receive pressurized air via nozzles 172. Other types of actuators may be utilized including, but not limited to, hydraulic actuators, electromagnetic actuators, electronic actuators, etc. and/or combinations thereof. Embodiments of the present invention are not limited to pneumatic actuators.

When the frame 152 is moved to the engaged position, an egg support assembly 130 supported thereon is moved upwardly so that each pedestal 134 attached thereto extends into the pocket of an egg flat and supports a respective egg during in ovo injection. According to embodiments of the present invention, each pedestal 134 may raise each egg slightly from the egg flat, although this is not required.

Figure 13:
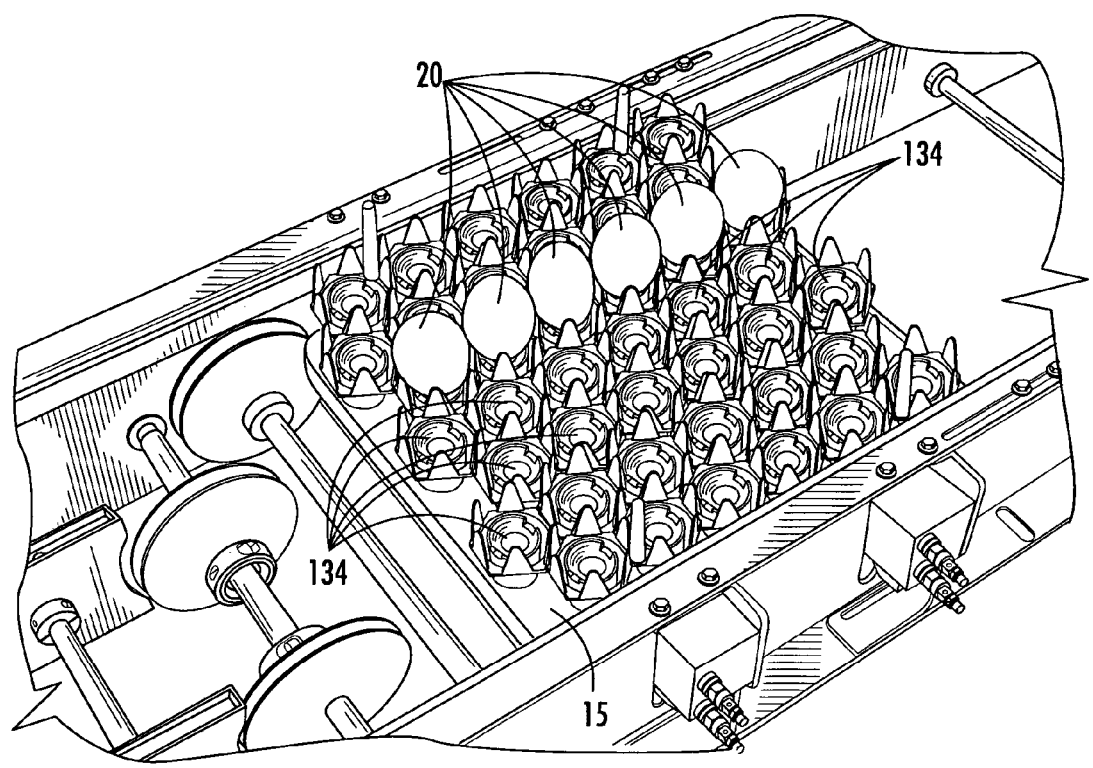
FIG. 13 is a perspective view of the egg support assembly of the present invention with the pedestals moved to an engaged position so as to support eggs within an egg flat.
Figure 14:
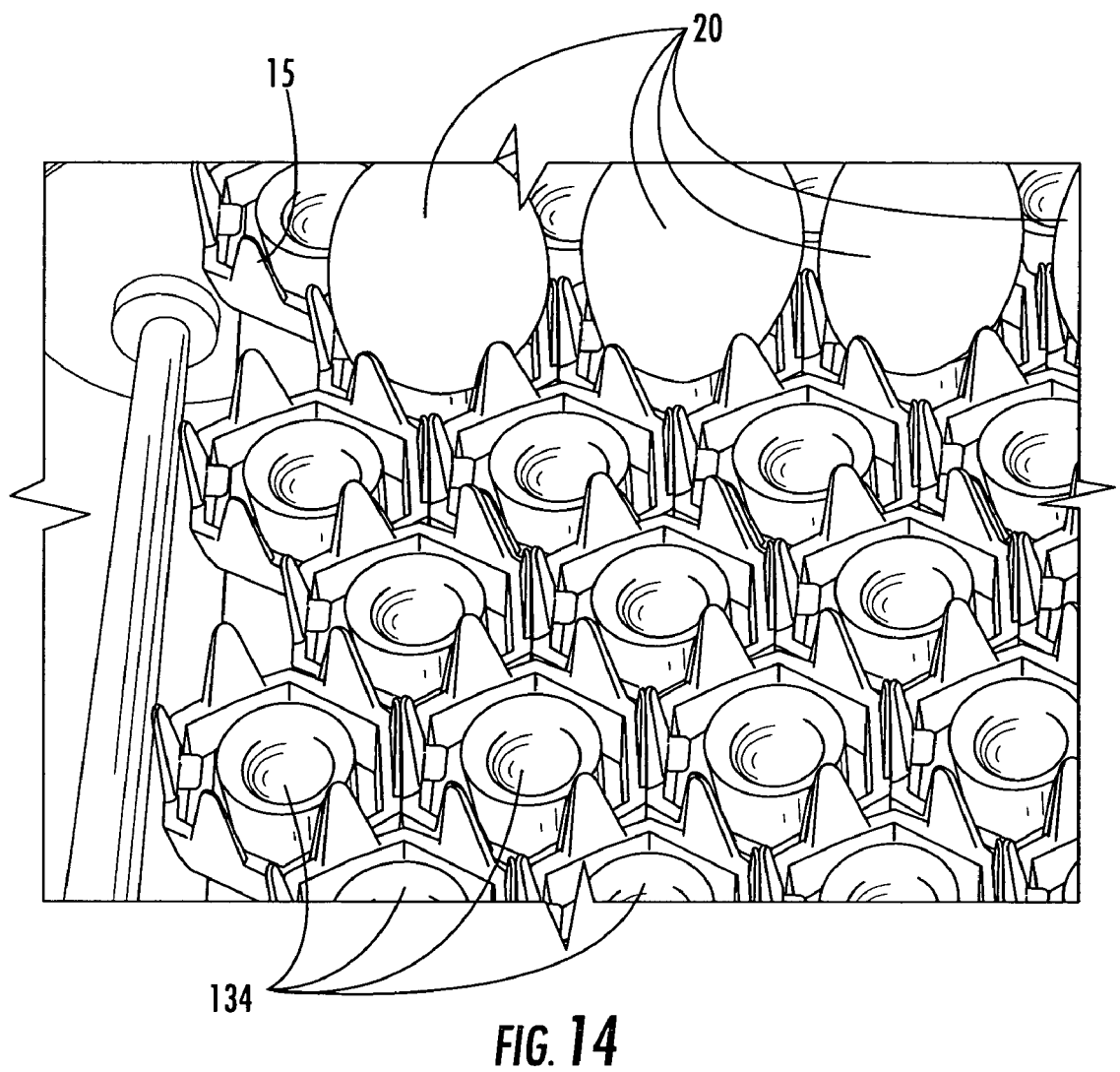
FIG. 14 is an enlarged perspective view of a portion of the egg support assembly and egg flat of FIG. 13.

FIGS. 13–14 illustrate the frame 152 and pedestal plate 132 of the egg support assembly 130 moved to an engaged position. A row of eggs 20 in an egg flat 15 are supported by respective pedestals 134 which extend upwardly into the egg flat pockets. Each pedestal 134 provides solid support for a respective egg 20 and reduces damage to an egg resulting from contact from an injection device. Moreover, each pedestal 134 prevents an egg from being pushed downwardly against flexible portions of the egg flat pocket.

In operation, an egg flat 15 containing a plurality of eggs 20 is moved over the egg support assembly 130 prior to injection by a plurality of injection heads. The frame 152 of the egg support assembly 130 is moved upwardly such that the plate 132 containing a plurality of pedestals 134 is moved upwardly until each pedestal 134 engages a respective egg 20. The injection heads 25 contact the eggs, which are supported by the pedestals 134, form an opening in the shell thereof and deliver a predetermined dosage of a treatment substance into (and/or remove a substance from) the egg via the opening.

Figure 15A:
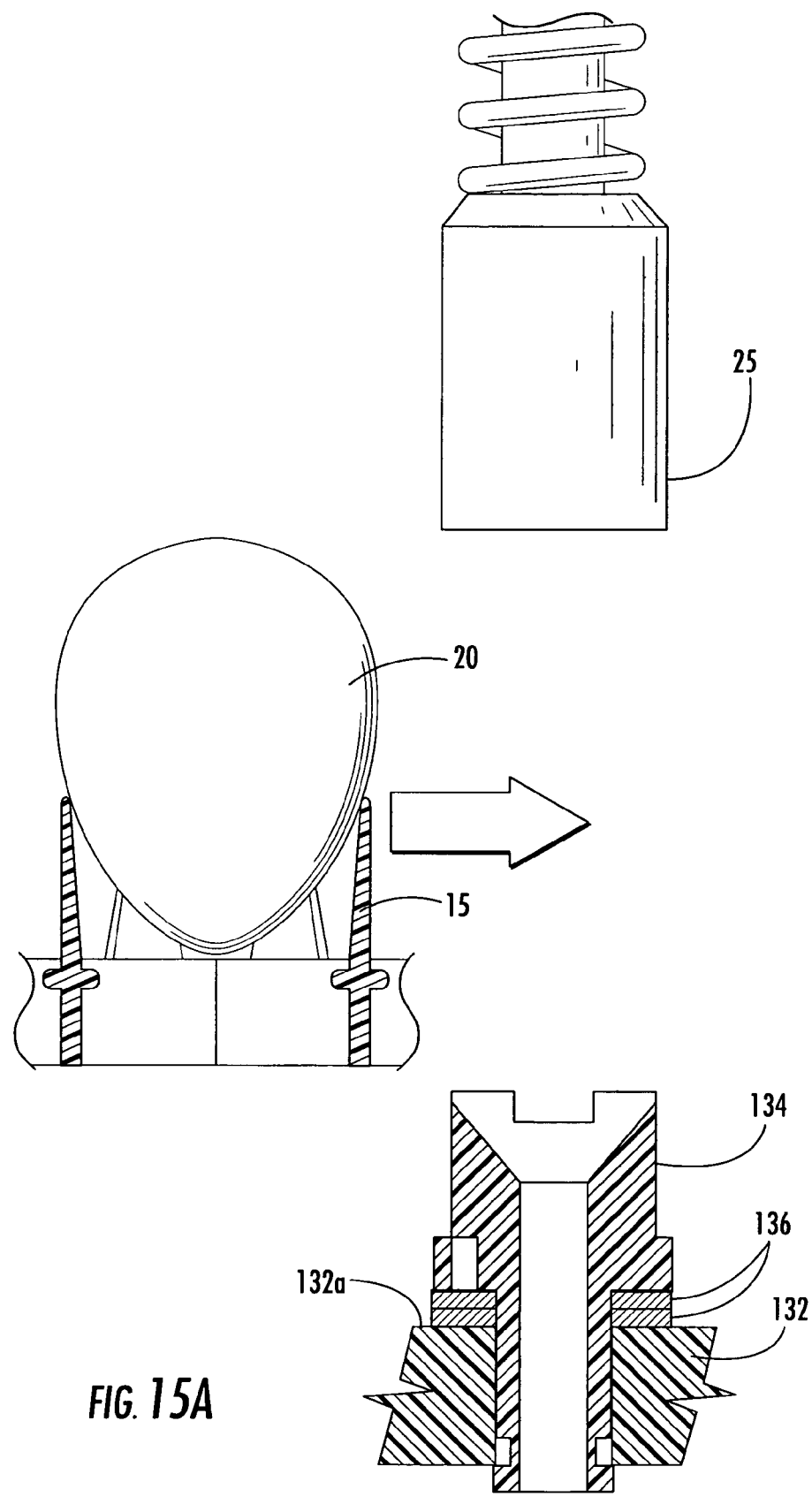
FIGS. 15A–15E illustrate sequential operations for supporting an egg via the egg support assembly according to embodiments of the present invention.
Figure 15B:
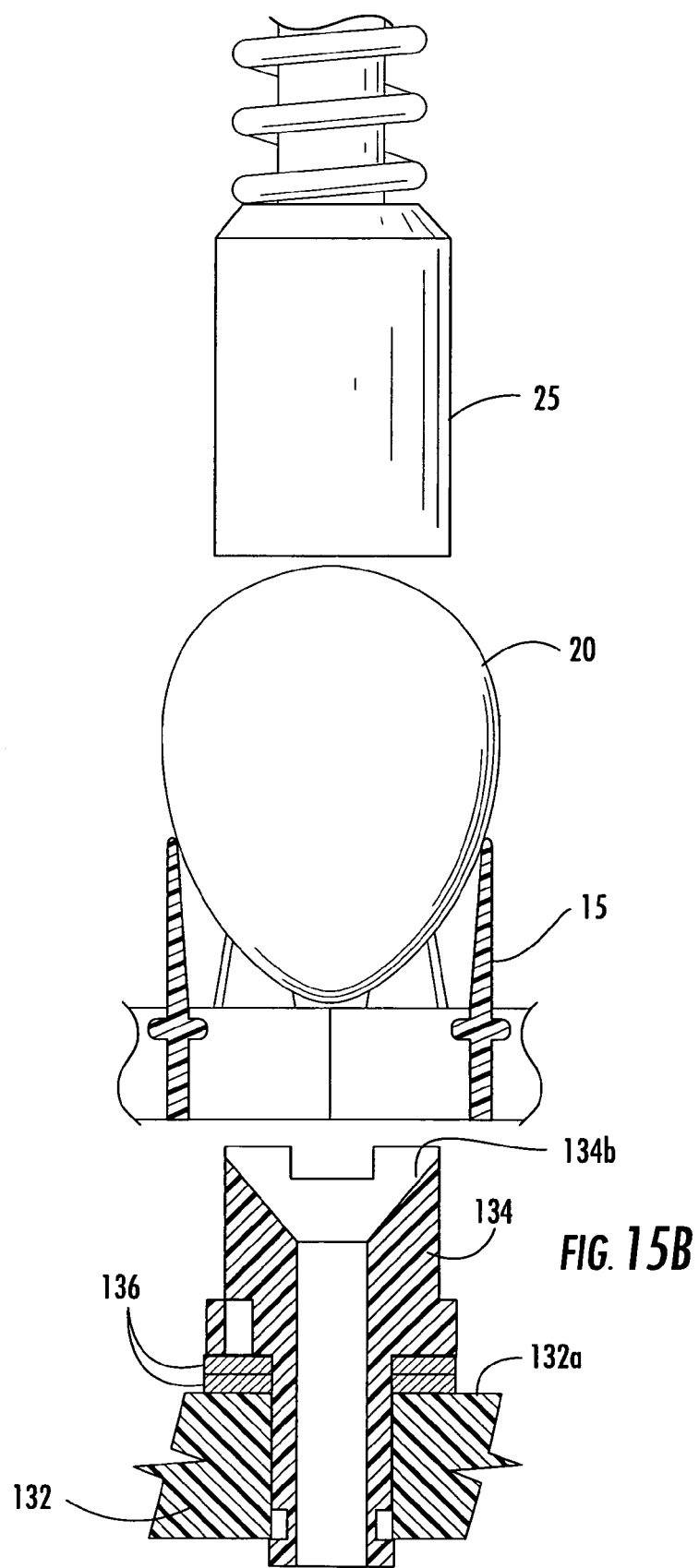
Figure 15C:
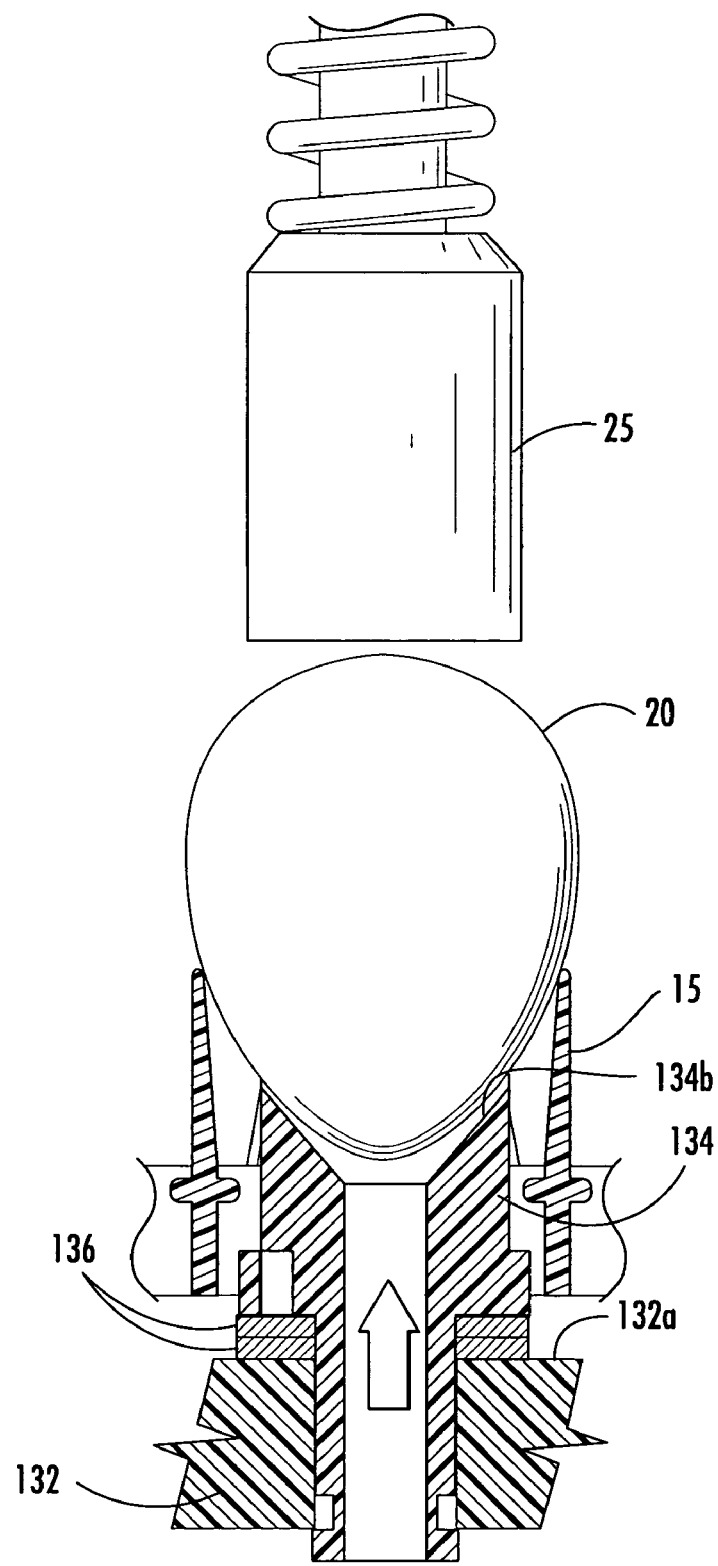
Figure 15D:
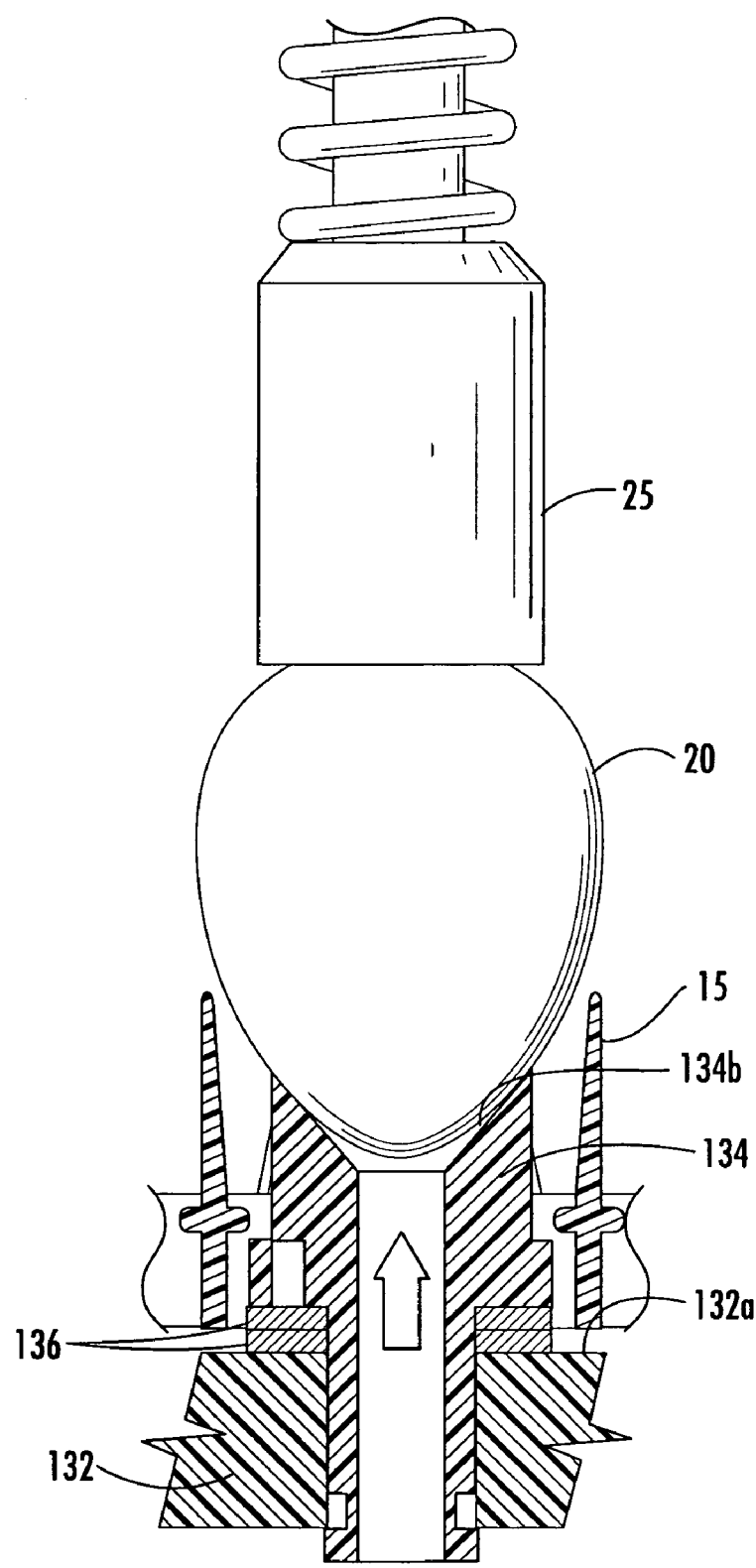
Figure 15E:
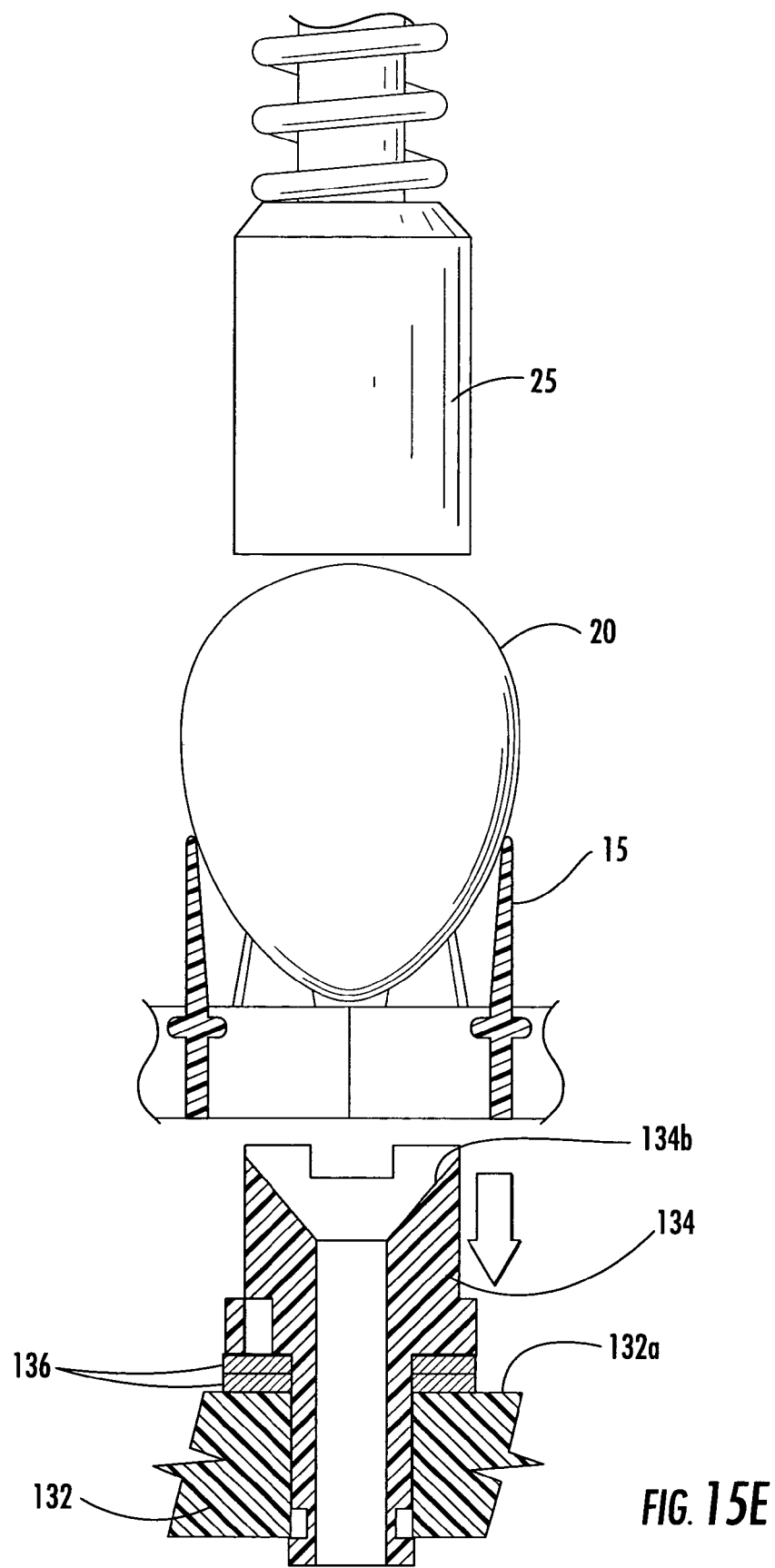

Referring now to FIGS. 15A–15E, sequential operations for supporting an egg 20 via a pedestal 134 according to embodiments of the present invention, will now be described. Referring initially to FIGS. 15A–15B, an egg flat 15 is moved into position such that an egg injection head 25 is positioned above an egg 20, and such that a pedestal 134 of an egg support assembly 130 is positioned beneath the egg 20. In FIG. 15C, the pedestal 134 is moved upwardly, as described above, such that the pedestal distal free end 134b contacts the egg 20 as the egg injection head 25 moves downwardly into contact with the egg 20. In FIG. 15D, the pedestal 134 has actually lifted the egg 20 slightly upwardly from the egg flat 15. After in ovo injection (or in ovo material removal), the injection head 25 is moved upwardly and the pedestal 134 is moved downwardly from the egg 20, as illustrated in FIG. 15E.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An in ovo injection apparatus, comprising:
an egg carrier that holds a plurality of eggs and provides external access to the eggs;
a plurality of injection devices positioned above the carrier, wherein each injection device is configured to contact a respective egg in the carrier and deliver a predetermined dosage of a treatment substance into the egg and/or remove material from the egg; and
an egg support assembly positioned beneath the carrier that is configured to solidly support each egg in the carrier during contact therewith by a respective injection device and to prevent each egg from being pushed downwardly into the carrier by a respective injection device wherein the egg support assembly comprises:
a frame movable between an operative position and a retracted position;
a plate attached to the frame and comprising an array of openings formed therein; and
a plurality of pedestals, each pedestal removably and snugly secured within a respective one of the openings, wherein each pedestal comprises a free end portion configured to engage an egg within the carrier when the frame is in the operative position.

2. The apparatus of claim 1, wherein the egg support assembly is operatively associated with the plurality of injection devices such that each pedestal moves upwardly through a respective opening in the carrier to support an egg as a respective injection device makes contact with the egg.

3. The apparatus of claim 1, wherein the egg support assembly is configured to lift each egg from the cater during contact with each egg by a respective injection device.

4. The apparatus of claim 1, wherein a height of the free end portion of each pedestal relative to the plate is adjustable.

5. The apparatus of claim 4, wherein the height of the free end portion of each pedestal relative to the plate is adjustable via one or more shims disposed between the free end portion and the plate.

6. The apparatus of claim 1, wherein each pedestal includes a proximal end opposite from the free end portion, and wherein an O-ring is secured to the proximal end that provides a snug, friction fit when the proximal end is disposed within a respective one of the plate openings.

7. The apparatus of claim 1, wherein each pedestal free end portion has a concave configuration.

8. The apparatus of claim 7, wherein each pedestal free end portion comprises a wall tat is inclined relative to a centerline of the pedestal that is between about twenty five degrees and about fifty five degrees (25°–55°).

9. The apparatus of claim 1, wherein the support assembly frame is movable via actuators selected from the group consisting of pneumatic actuators, hydraulic actuators, electronic actuators, and electromagnetic actuators.

10. An in ovo injection apparatus, comprising:
an egg carrier that holds a plurality of eggs and provides external access to the eggs;
a plurality of injection devices positioned above the carrier, wherein each injection device is configured to contact a respective egg in the carrier and deliver a predetermined dosage of a treatment substance into the egg and/or remove material from the egg; and
an egg support assembly positioned beneath the carrier that is configured to solidly support each egg in the carrier, wherein the egg support assembly prevents each egg from being pushed downwardly into the carrier by a respective injection device, and wherein the egg support assembly lifts each egg upwardly from the carrier during contact therewith by a respective injection device, wherein the egg support assembly comprises:
a frame movable between an operative position and a retracted position;
a plate attached to the frame and comprising an array of openings formed therein; and
a plurality of pedestals, each pedestal removably and snugly secured within a respective one of the openings, wherein each pedestal comprises a free end portion configured to engage an egg within the carrier when the frame is in the operative position.

11. The apparatus of claim 10, wherein the egg support assembly is operatively associated with the plurality of injection devices such that each pedestal moves upwardly through a respective opening in the carrier to support an egg as a respective injection device makes contact with the egg.

12. The apparatus of claim 10, wherein a height of the free end portion of each pedestal relative to the plate is adjustable.

13. The apparatus of claim 12, wherein the height of the free end portion of each pedestal relative to the plate is adjustable via one or more shims disposed between the free end portion and the plate.

14. The apparatus of claim 10, wherein each pedestal includes a proximal end opposite from the free end portion, and wherein an O-ring is secured to the proximal end that provides a snug, friction fit when the proximal end is disposed within a respective one of the plate openings.

15. The apparatus of claim 10, wherein each pedestal free end portion has a concave configuration.

16. The apparatus of claim 15, wherein each pedestal free end portion comprises a wail that is inclined relative to a centerline of the pedestal that is between about twenty five degrees and about fifty five degrees (25°–55°).

17. The apparatus of claim 10, wherein the support assembly frame is movable via actuators selected from the group consisting of pneumatic actuators, hydraulic actuators, electronic actuators, and electromagnetic actuators.

18. An in ovo injection apparatus, comprising:
an egg carrier that holds a plurality of eggs and provides external access to the eggs;
a plurality of injection devices positioned above the carrier, wherein each injection device is configured to contact a respective egg in the carrier and deliver a predetermined dosage of a treatment substance into the egg and/or remove material from the egg; and
an egg support assembly positioned beneath the carrier that is configured to solidly support each egg in the carrier during contact therewith by a respective injection device, and prevent each egg from being pushed downwardly into the carrier by a respective injection device, wherein the egg support assembly comprises:
a frame movable between an operative position and a retracted position;
a plate attached to the frame and comprising an array of openings formed therein; and a plurality of pedestals, each pedestal removably and snugly secured within a respective one of the openings, wherein each pedestal comprises a concave free end portion configured to engage an egg within the carrier when the frame is in the operative position, and wherein a height of the free end portion of each pedestal relative to the plate is adjustable.

19. The apparatus of claim 18, wherein the egg support assembly is operatively associated with the plurality of injection devices such that each pedestal moves upwardly through a respective opening in the carrier to support an egg as a respective injection device makes contact with the egg.

20. The apparatus of claim 18, wherein the egg support assembly is configured to lift each egg from the carrier during contact with each egg by a respective injection device.

21. The apparatus of claim 18, wherein a height of the free end portion of each pedestal relative to the plate is adjustable via one or more shims disposed between the free end portion and the plate.

22. The apparatus of claim 18, wherein each pedestal includes a proximal end opposite from the free end portion, and wherein an O-ring is secured to the proximal end that provides a snug, friction fit when the proximal end is disposed within a respective one of the plate openings.

23. The apparatus of claim 18, wherein each pedestal free end portion comprises a wall that is inclined relative to a centerline of the pedestal that is between about twenty five degrees and about fifty five degrees (25°–55°).

24. The apparatus of claim 18, wherein the support assembly frame is movable via actuators selected from the group consisting of pneumatic actuators, hydraulic actuators, electronic actuators, and electromagnetic actuators.

25. A method of injecting eggs in ova, comprising:
positioning an egg carrier containing a plurality of eggs beneath a plurality of injection devices, wherein each injection device is configured to contact a respective egg in the carrier and deliver a predetermined dosage of a treatment substance into the egg and/or remove material from the egg; and
supporting the plurality of eggs from beneath the egg carrier while simultaneously delivering a predetermined dosage of a treatment substance into each egg and/or removing material from each egg such that the eggs are prevented from being pushed downwardly into the carrier by a respective injection device wherein supporting the plurality of eggs comprises positioning an egg support assembly beneath the egg carrier, wherein the egg support assembly comprises:
a frame movable between an operative position and a retracted position;
a plate attached to the frame and comprising an array of openings formed therein; and
a plurality of pedestals, each pedestal removably and snugly secured within a respective one of the openings, wherein each pedestal comprises a free end portion configured to engage an egg within the carrier when the frame is in the operative position.

26. The method of claim 25, wherein supporting the plurality of eggs comprises lifting the eggs upwardly from the egg carrier.

27. The method of claim 25, wherein each pedestal free end portion has a concave configuration.

* * * * *

UNITED STATES PATENT AND TRADEMARK OFFICE
CERTIFICATE OF CORRECTION

PATENT NO. : 6,981,470 B2  Page 1 of 1
DATED : January 3, 2006
INVENTOR(S) : Gross et al.

It is certified that error appears in the above-identified patent and that said Letters Patent is hereby corrected as shown below:

Column 7,
Line 39, should read -- assembly is configured to lift each egg from the carrier during --.
Line 56, should read -- end portion comprises a wall that is inclined relative to a --.

Signed and Sealed this

Sixth Day of June, 2006

JON W. DUDAS
*Director of the United States Patent and Trademark Office*